March 12, 1963     H. T. DE MAN     3,080,840
PRESS TRANSFER MECHANISM
Filed March 17, 1960     7 Sheets-Sheet 1

INVENTOR
HEIKO TJARK DE MAN

BY *F. J. Soucek*

ATTORNEY

United States Patent Office 3,080,840
Patented Mar. 12, 1963

3,080,840
PRESS TRANSFER MECHANISM
Heiko T. de Man, Liverpool, N.Y., assignor to General Motors Corporation, Detroit, Mich., a corporation of Delaware
Filed Mar. 17, 1960, Ser. No. 15,722
3 Claims. (Cl. 113—50)

This invention relates to a mechanism for transferring articles, and more particularly to a pivotal transfer mechanism with a gripping device for moving articles between successive production stages.

Numerous transfer devices, sometimes called "iron hands," have been invented in the past and some of these are used widely today in production applications. These devices operate by mechanical or by a combination of mechanical and fluid pressure actuation. Even though these mechanisms are a great advantage over the prior art, difficulties have been experienced when the units are used with high speed production applications. Shortcomings of the prior art type of unit are due to a combination of factors including the inability of the gripping unit to move freely and quickly in all dimensions, the usual necessity of the movement of the entire power unit on reciprocating tracks, the lack of flexibility of prior type units, the large amount of backlash encountered with units using mechanical camming, difficulty in the integration of several transfer units into a complex production system, and others too numerous to mention.

It is the object of this invention, therefore, to provide a transfer mechanism which can be readily adapted to high speed or low speed production set-ups, and, further, one which is very flexible and can operate in all dimensions with great ease and speed. It is desirous to provide such a unit which can do these things entirely by fluid power motivation.

Another object is to provide a transfer system wherein several of the transfer units are fully integrated and synchronized to enable a series of successive production steps to be performed. Further, these several units are constructed such that they all may be readily operated from the same control system, thus requiring fewer human operators and thereby reducing production costs.

Another important object of the present invention is to provide a transfer mechanism which operates with very little or no backlash with each movement, resulting in very accurate operations even at high speeds; further to provide a new type of gripping "hand" which will operate simply, yet smoothly and accurately when used in combination with a transfer unit.

Other objects will readily appear from a study of the following specification and the drawings, wherein like numerals refer to like parts in the several views, and wherein:

FIGURE 2 is a plan view of a single transfer unit;
FIGURE 9 is cross section 9—9 of the gripping device in FIGURE 6.

Briefly, the invention concerns a transfer system which is electrically controlled and synchronized for carrying production items through a series of operations such as successive press-forming steps. The compact system is made up of several units controlled through an electrical control circuit, a timing mechanism, and a series of solenoid valves. The solenoid valves control a pressurized fluid which operates fluid motors on each unit to give direction al movement to a transfer arm, and the fluid also may operate knock-out devices on press-forming dies. An electrical cam switch operates individual switches which in turn actuate the solenoid valves to sequence the various arm movements. A series of relays in the overall control circuit synchronizes the movements of the several units. Thus the entire group of transfer units can operate effectively in a complex production set-up.

Each individual arm is capable of extending, retracting, raising, lowering, pivoting and gripping while transferring an article. The several movements occur in different dimensions, thus resulting in a very flexible unit. All of these movements are effected while the basic unit is substantially stationary at one locus. The operation of all of these arm movements is accomplished by the fluid motors located on each individual unit. Each transfer unit arm also contains a gripping device which comprises a set of jaws for grasping the production article. The construction and the materials of the jaws are such that the article grasped is firmly held but is not damaged during the rapid operation.

Figure 1:
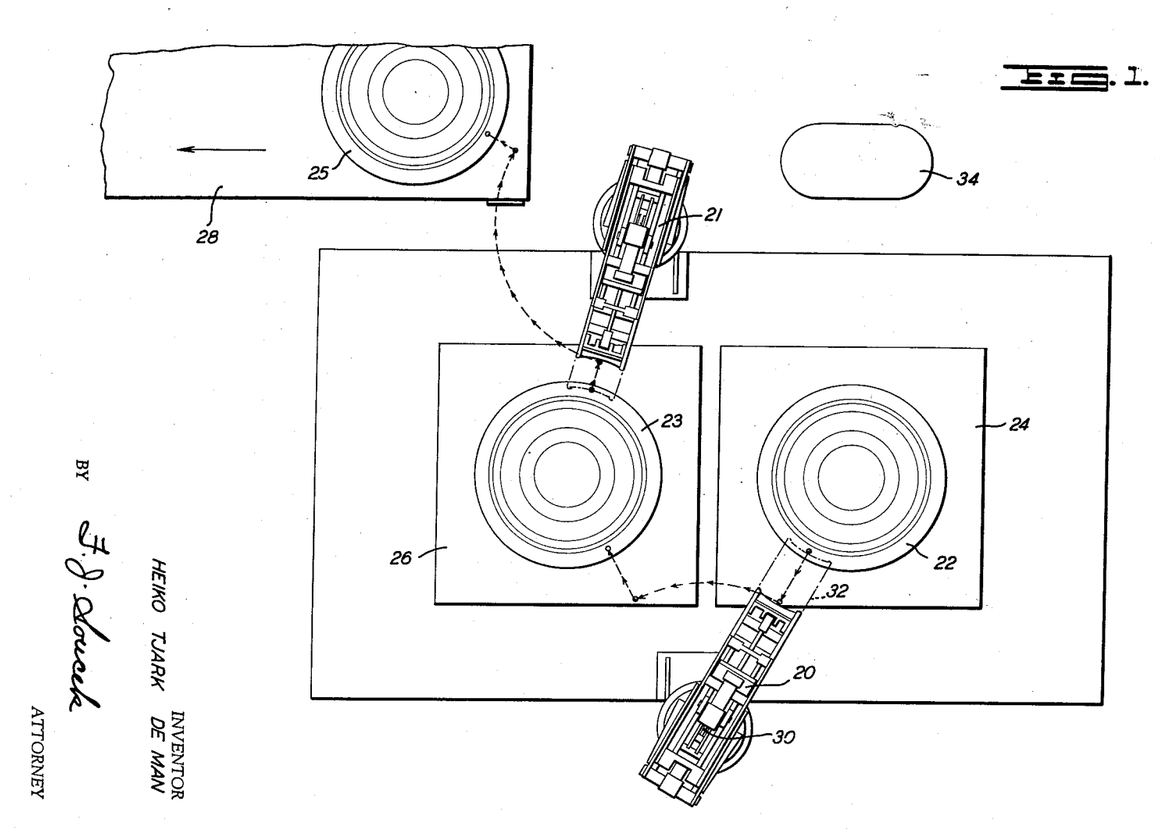
FIGURE 1 is a plan view of several transfer units integrated to facilitate a series of production steps.
Figure 3:
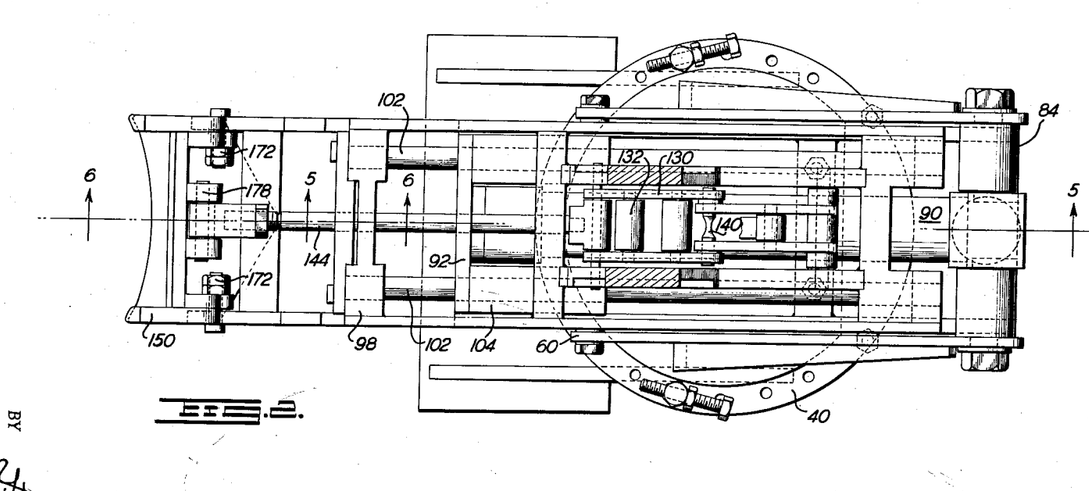
FIGURE 3 is a side elevation of the unit in its at-rest position.

Referring now to FIGURE 1, a series of transfer units 20 and 21 are integrated into a complex system to transfer such items as wheel covers 22, 23, and 25 from one press die 24 to a second press die 26; and after the pressing operation on die 26 has taken place, to transfer the wheel cover onto a conveyor 28 by the second unit 21. It is obvious that more than two units as shown in FIGURE 1 may be integrated, thus supplementing an entire series of production steps. The arrows on FIGURE 1 indicate the various maneuvering steps which the transfer units go through as the wheel covers are moved. The transfer unit 20 originates in the position shown by heavy lines in FIGURE 1. It extends toward cover 22 as shown by dotted lines 32. The gripping device clamps onto the wheel cover 22 which is located on the press die 24. The unit then lifts the wheel cover, retracts, and then swings counterclockwise around the pivotal point 30 as shown by the arrows. At the end of the pivotal motion the arm extends over the second press die 26, and lowers the wheel cover onto this press die. The wheel cover is then released and the transfer unit retracts in order to return for another cover which the operator 34 has placed on die 24. The second transfer unit 21 operates in the same manner in transferring the wheel cover from die 26 to the exit conveyor 28. The two units are synchronized to facilitate a smooth operation.

Figure 11:
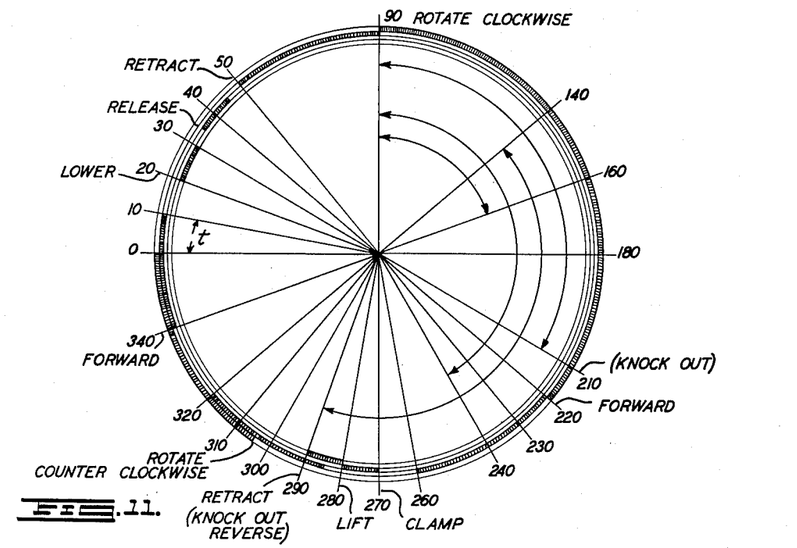
FIGURE 11 is a diagrammatic view of the timing cycle for the unit.

In FIGURE 11 is shown the timing cycle for these several movements of extension, rotation, clamping, etc. The several steps proceed in a clockwise movement on the circular graph. The angular portions t of this circular representation of the timing cycle each represent a unit of time. This unit of time may be varied, by altering the gear-down ratio between the timing cam and the electric motor which drives the cam. The small motor and the gearing drive are conventional as used with timing mechanisms, and being well known in the art, are not discussed in detail. Each of the operations represented on the timing cycle may be activated by one normally open and one normally closed contact. The dark arcuate portions of the timing cycle in FIGURE 11 represent the time of operation of each movement as these contacts are closed and opened by the camming action. For example, at 220°, the arcuate camming portion closes a normally open switch causing the extension arm to move forward as shown by the dotted lines 32 in FIGURE 1, and this continues up to 260°. At this point the normally closed contact of this switch is opened to break the circuit. Then at 270° the clamping movement is activated. Other switches actuate the remaining movements of the unit throughout the complete cycle. Separate switches may be used to actuate the press knock-out means as indicated on the timing cycle. It may be seen that the stated sequence of operations is advantageous for the transfer set-up shown in FIGURE 1, but it may readily be altered for different production arrangements.

Conventional timing circuits may be utilized to operate a multiplicity of individual units simultaneously, using solenoid valves to control the fluid supply to the necessary fluid motors on the units. Two fluid inlets can be used on each valve to operate both the forward and reverse movements of each motor. To control two extension motors, a four-way valve may be used, and so on. An additional valve may control the fluid supply to the press knock-out means. Obviously, the knock-out system may not be needed if the transfer unit is used in connection with another type apparatus. The control circuit may be actuated by an operator through conventional series type press palm buttons. The synchronization of several of these actuated transfer units may be effected through a series of control relays. A suitable start and stop switch is used in combination with a switch located on the ram of a press to break a holding circuit. This circuit is reset by the passing of a finished article on the outgoing conveyor using a photoelectric eye detector or some similar device and prevents doubling up of articles in the dies. Various control circuits may be adapted to the transfer system depending on the application of the device. This equipment, being conventional and so well known in the art, is not shown in the drawings.

Referring now to FIGURES 2, 3, 4, and 5, a stationary base member 40 attached to table 41 is used as the mounting device for the main body of each of these units. The flat members 42 and 44 are attached to this unit on a pivotal piece 46. The nuts 48 hold the members 42 and 44 onto the base plate 40 by means of a retaining ring 50. The bearings 54 allow the upper plates to rotate in respect to the stationary base plate 40. Beneath the plate 40 is mounted a fluid type swinging motor 56. This motor may be a hydromotor such as is marketed by Hydromotor Products of Canton, Ohio. The motor itself is actuated by a pressurized fluid and operates in a rotating fashion such that the entire unit above the base plate 40 may be pivoted about pin 46. Obviously, this structure may be altered to accomplish the same purpose without departing from the scope of the overall invention.

Figure 4:
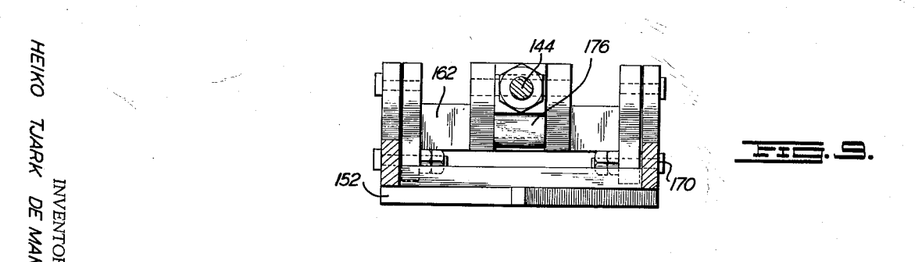
FIGURE 4 is a side elevation of the unit in its tilted and extended position.

Extending upwardly from the plate 44 is a pair of trunnions 58 between which the actuating mechanism for the transfer arm itself is mounted. At the forward part of the trunnions are located pivotal pins 60 about which the carriage member 62 may rotate in a vertical plane within a controlled angle as shown by FIGURE 4. This carriage 62 has an adjustable stop 64 which prevents the carriage from rotating counterclockwise in an unlimited manner. Likewise, stop 66 limits the clockwise movement by abutting against the beveled surface 70 on plate 44 as shown in FIGURE 4. A set of adjustable stops 72 is also provided for the rotative movement of the unit. At the rear of the carriage 36 is an upstanding portion 76 upon which the pivot 78 is mounted. The fluid motor 80 which is preferably of the cylinder and piston type is mounted upon the trunnions 58 at pivot 84 and actuates the carriage 62 by means of an extending piston 86 as shown in FIGURE 4. This piston connects to the carriage 62 at the pivotal point 78. Thus the rear of the carriage 62 may be lowered by the motor 80 thereby causing clockwise motion about pivot 60 and consequently raising the gripping means which is located at the opposite end of the unit. Mounted upon the carriage 62 is a second fluid motor 90 which abuts at the rear against piece 76, and which abuts at the front against the forward piece 92. The piston 94 of this fluid motor 90 attaches to member 98 of the extension arm. Upon actuation of this fluid motor the piston 94 extends and causes the arm to move forward. This movement is guided by the parallel rods 102 within bearings 104. The sliding arm 108 may thus be extended, as in FIGURE 4, or retracted as in FIGURE 5 in a telescopic fashion. Various modifications of this extension arrangement are foreseeable such as an unfolding member or a cable actuator assembly.

Figures 7, 10:
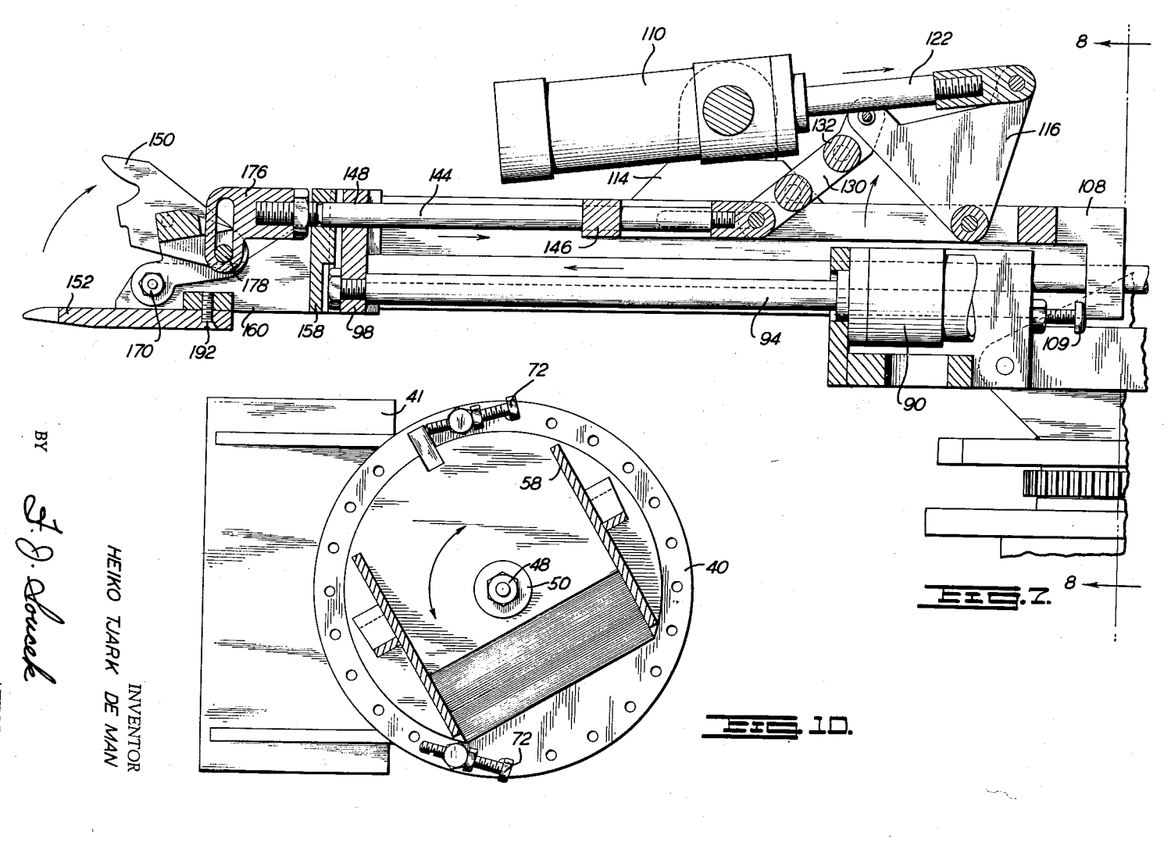
FIGURE 7 is a side elevation showing the gripping hand in its open position.
FIGURE 10 is cross section 10—10 of the base in FIGURE 3.

A third reciprocating-type fluid motor 110 is pivotally mounted at 112 between the trunnions 114 which form part of arm 108. This motor attaches to bellcrank 116 at the pivot 118. An intermediate collar 120 is attached to the motor piston 122 to facilitate the arrangement. Actuation of the motor 110 rotates the bellcrank 116 in a clockwise direction around pivot 117 as shown in FIGURE 7. This causes a clockwise movement of pivot 128 and thereby moves the linkage 130 up and towards the rear of the transfer unit. Lost motion of the rollers 132 within the linkage occurs due to a longitudinal slot 134. At the extreme point of movement the piston 122 abuts the concave surface of member 140 and locks the bellcrank in its off-centered position, shown in FIGURE 7, to hold the gripper in the open position. Connected fixedly to this linkage is an extension rod 144 which rides in the bearings 146 and 148. This rod 144 reciprocates within the arm 108 and actuates the gripping device shown in FIGURE 9. The rod may be replaced by any suitable push-pull member such as a Bowden cable or the like. When the motor 110 is actuated, the bellcrank 116 pivots clockwise and the rod 144 is retracted toward the rear of the unit. This causes the rod to slide through the piece 148 and likewise the collar 146 to open the jaws as in FIGURE 7.

The gripping device is unique since the construction allows very high speed use without damage to the article to which it attaches. The device is made up of an upper jaw 150 and a lower jaw 152. The lower jaw 152 is fixedly attached to the member 158 through an intermediate piece 160. The upper jaw 150 is fixedly attached to yoke 162 by fasteners. This yoke, in turn, is pivotally mounted upon piece 160 at points 170 by bolts 172. The jaw 150 is actuated by the sliding of arm 144 and when actuated, collar 176 slides over pin 178. This pin moves downward in slot 180 to assume the final position shown in FIGURE 7. This overall linkage facilitates smooth action of the gripping device.

Figures 5, 6:
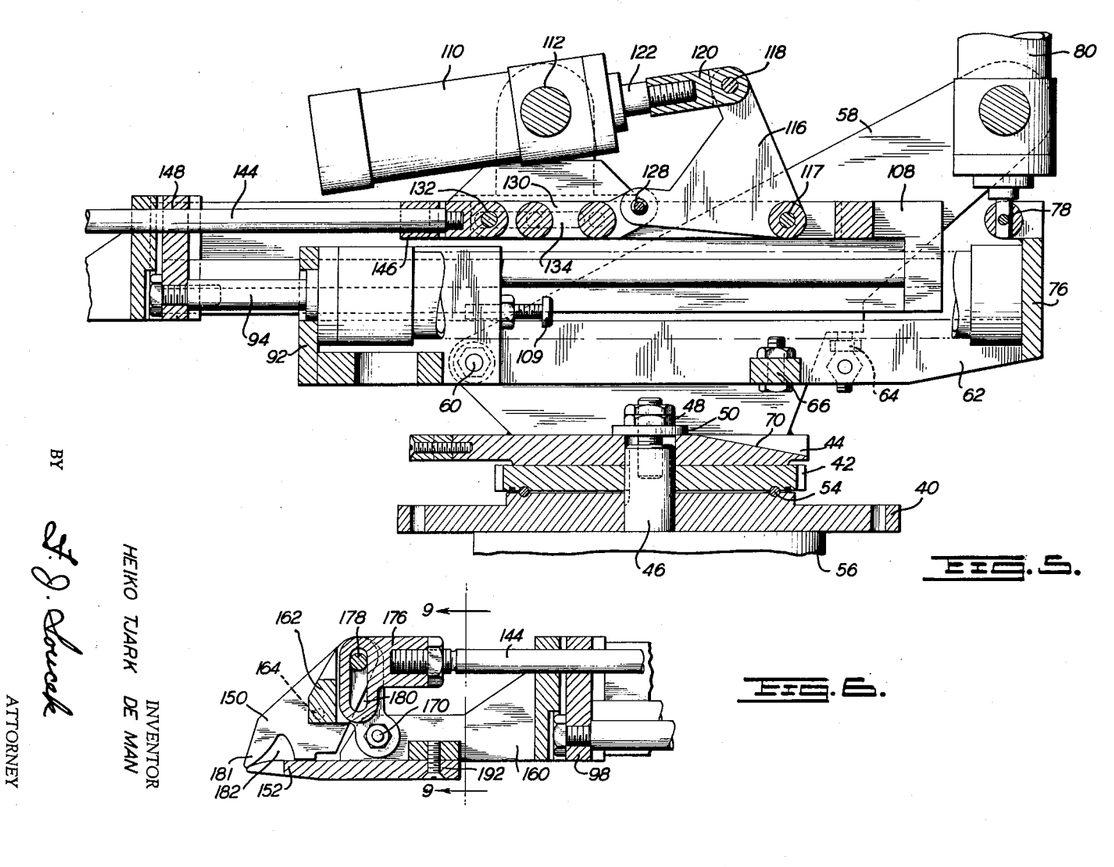
FIGURE 5 is cross section 5—5 of FIGURE 2.
FIGURE 6 is cross section 6—6 of FIGURE 2, showing the gripping hand.

The jaws are preferably made of a fiber composition. Thus clamping onto the wheel cover or other article will not result in damage to the article even under high speed conditions. Also the fiber composition prevents damage to the press dies in case the system fails and the press closes upon the gripping device. Normally, however, the safety mechanism which is constructed into the electrical control system will prevent any such mishap. The upper jaw, as shown in FIGURE 6, has a nose portion 181 and a recessed portion 182. This facilitates gripping of the shaped wheel cover 22 in FIGURE 3 when the knock-out device 188 has pushed the cover off the die 24. Obviously, however, the shape of the jaws may vary somewhat with the particular application. Removal of the upper jaw for replacement may be accomplished easily by removing the fasteners 172 and the pin 178 (see FIGURE 2). The lower jaw is fastened by cap screws 192 or the like and it also may be exchanged for a modified counterpart.

Figure 8:
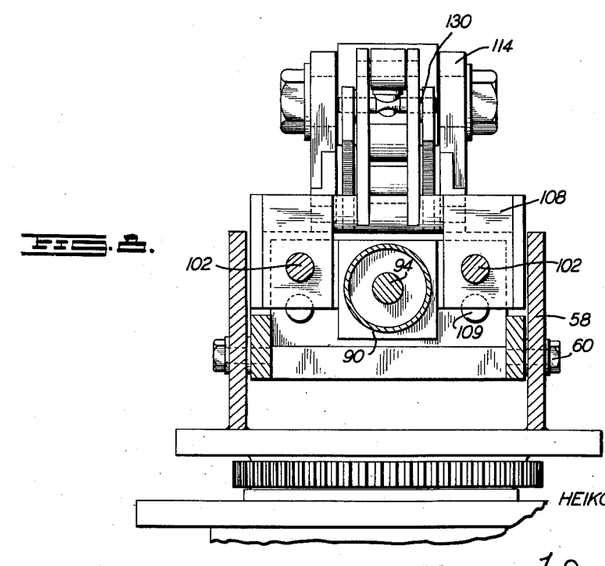
FIGURE 8 is cross section 8—8 of FIGURE 7.

In FIGURE 8, the carriage 108 in more detail in relation to its guide rods 102 and actuation motor 90 and piston 94. The gripper operating linkage 130 is shown between trunnions 114. The adjustable stops 109 limit the movement of the carriage 108 when it is extended from the position shown in FIGURE 5 to that shown in FIGURE 7. In FIGURE 9, the yoke portion 162 of the gripping device, the lower jaw 152, and the actuating rod 144 are shown more clearly. FIGURE 10 shows how the the trunnions 58 rotate on base 40, with stops 72 limiting the movement.

In operation, motor 56 causes the unit to pivot horizontally about pin 46 toward the article of manufacture at the point of origin of the article; motor 90 extends arm 108 toward the article; motor 110 then actuates the gripping device to seize the production article; next, motor 80 causes the arm to raise the article by initiating a vertical clockwise movement about pivot 60; motor 90 then retracts arm 108; the unit then pivots back by reverse actuation of motor 56; the arm then extends the article over the second station by means of motor 90; the arm is lowered through actuation of motor 80; and finally motor 110 causes the gripping device to release the article of manufacture at the new location. After the stage of production at the second station has been completed, a second integrated unit moves the article in a similar manner to the third station, and so forth.

It may be seen that many possible modifications may be made in the unit as described and in the system which comprises a series of these units operating integrally. Thus, changes in the relative mountings of the motors, in the shape of the jaws, in the angles and directions of movement of the device, in the control circuit, in the production machines to be supplemented, in the type of motors used, in the timing scheme, and other obvious modifications are contemplated to be within the scope of my invention. It is intended that my invention shall be limited only by the scope of the following claims and the reasonable equivalents thereof.

What I claim is:

1. Apparatus for transferring articles from press dies and the like, having in combination a clamping device for grasping an article comprising a fixed lower jaw and an upper jaw pivotally mounted on said lower jaw, axially slidable means pivotally connected to said upper jaw to effectuate grasping and releasing of said article, a telescopically extensible and retractable lever including an extending portion operatively attached to said clamping device and a non-extending portion, a piston and cylinder type fluid motor connected to said lever to extend and retract the same, a bed for the non-extending portion of said lower, mounting members on which said bed is pivotally mounted, a piston and cylinder type fluid motor located on said mounting members and capable of vertically oscillating said bed around said pivotal mounts thus imparting a vertcial movement to said lever and clamping device, and a stationary rotary-type fluid motor fixedly attached to said mounting members and capable of rotating the entire assembly in an arcuate path.

2. A cyclically controlled article transfer device providing independent swinging, lifting, extending and gripping movements to transfer a work piece between a plurality of machines comprising a stationary base member, a rotatable base member, parallel support members fixed to the rotatable base, a carriage member pivotally connected between the parallel support members and having at one end a first fluid motor to impart a vertical lifting motion to the other end of the carriage, an extensible arm member slidably mounted on said carriage member whereby the carriage provides a base support for the arm and the arm is slidably guided by parallel rods associated with the carriage, a second fluid motor located between the carriage and the arm in such relationship that the motor imparts a reciprocating motion to the arm extending the arm at said other carriage end, and said arm telescopically encloses the second motor when the arm is in the retracted position, an extensible rod telescopically mounted on said extensible arm member and being connected at one end to a third fluid motor through an interconnecting arrangement including a bellcrank and link element, said bellcrank being pivotally connected at three points, one point to the motor, the second point to the link element and the third point to the extensible arm, said link element being pivotally connected both at the bellcrank and at the extensible rod to impart a reciprocating motion to the rod from the motor; and a work piece gripper means including an upper jaw pivotally connected through a slot and pin arrangement to the extending end of the extensible rod and a lower jaw member fixedly attached to the outer end of the extensible arm wherein said gripper means is opened and closed by the reciprocating motion of the extensible rod.

3. A transfer device which can operate effectively about a stationary point and which has in combination a main body pivotally mounted at the stationary point on a pivotal axis, a motor to rotate said main body about its pivotal axis, a carriage pivotally mounted upon said main body such that the pivotal axis of said main body and the pivotal axis of said carriage are not in the same plane, an extensible arm slidably mounted on said carriage and having cooperating extensible segments, a motor to extend and retract said extensible arm, another motor for rotating said arm in an arc about its pivotal axis, a gripping means mounted upon said arm and comprising a lower jaw fixedly attached to said arm and an upper jaw pivotally mounted upon said lower jaw, and means for opening and closing said gripping means comprising a piston and cylinder type fluid motor, a pivotal bellcrank attached to the piston of said motor, and a slidable push-pull member operatively attached at one extremity to said bellcrank and pivotally attached at its other extremity to one of said gripping jaws.

References Cited in the file of this patent

UNITED STATES PATENTS

| 2,763,229 | Sahlin | Sept. 18, 1956 |
| 2,784,855 | Acker | Mar. 12, 1957 |
| 2,785,813 | Tofflemire | Mar. 19, 1957 |
| 2,815,866 | Watter | Dec. 10, 1957 |
| 2,868,582 | Loisell | Jan. 13, 1959 |
| 2,921,701 | Ireland | Jan. 19, 1960 |
| 2,940,623 | Shook | June 14, 1960 |

FOREIGN PATENTS

| 597,636 | Great Britain | Jan. 30, 1948 |

UNITED STATES PATENT OFFICE
CERTIFICATE OF CORRECTION

Patent No. 3,080,840                                                       March 12, 1963

Heiko T. de Man

It is hereby certified that error appears in the above numbered patent requiring correction and that the said Letters Patent should read as corrected below.

Column 2, line 11, for "direction al" read -- directional --; column 5, line 1, after "108" insert -- is shown --; line 9, strike out "the"; line 52, for "lower" read -- lever --; line 56, for "vertcial" read -- vertical --.

Signed and sealed this 1st day of October 1963.

(SEAL)
Attest:

ERNEST W. SWIDER                                        DAVID L. LADD
Attesting Officer                                                Commissioner of Patents